US007802659B2

(12) United States Patent
Huang

(10) Patent No.: US 7,802,659 B2
(45) Date of Patent: Sep. 28, 2010

(54) BRAKE CONTROL DEVICE FOR A WHEELED WALKER

(75) Inventor: Pao Shan Huang, Tai-Bau (TW)

(73) Assignee: Link Treasure Limited, Road Town, Tortola (VG)

(*) Notice: Subject to any disclaimer, the term of this patent is extended or adjusted under 35 U.S.C. 154(b) by 599 days.

(21) Appl. No.: 11/844,422

(22) Filed: Aug. 24, 2007

(65) Prior Publication Data

US 2008/0047785 A1 Feb. 28, 2008

(30) Foreign Application Priority Data

Aug. 24, 2006 (TW) .............................. 95214995 U

(51) Int. Cl.
*B62B 5/04* (2006.01)
*F16C 1/10* (2006.01)

(52) U.S. Cl. ......................... 188/19; 188/2 D; 74/502.2

(58) Field of Classification Search ................... 188/19, 188/20, 21, 29, 2 D, 2 F; 74/489, 502.2; 280/87.01, 87.021, 87.041, 87.051
See application file for complete search history.

(56) References Cited

U.S. PATENT DOCUMENTS 5,896,779 A * 4/1999 Biersteker et al. .......... 74/502.2
6,647,825 B1 * 11/2003 Lin ........................... 74/502.2

FOREIGN PATENT DOCUMENTS

JP 11-089899 6/1999

* cited by examiner

*Primary Examiner*—Thomas J Williams
(74) *Attorney, Agent, or Firm*—Tim Tingkang Xia; Morris, Manning & Martin LLP

(57) ABSTRACT

A brake control device has a handle, a controlling lever, a driving member and a swing lever. The controlling lever is designed for manipulating by hand and fingers that can be shifted between a braked position, a temporary braked position, and a released position. The swing lever has one end pivotally connected to the handle, and another end pivotally connected with the controlling lever and the driving member. The driving member has a portion slidably abutting an upper wall formed within the handle, and drives braking mechanism by pulling a connecting element via a rotation while the controlling lever moves the driving member either downwardly or upwardly. Preferably, the controlling lever is formed with a stop or protrusion at the lower edge thereof for self-keeping in the braked position for parking the wheeled walker.

12 Claims, 8 Drawing Sheets

BRAKE CONTROL DEVICE FOR A WHEELED WALKER

BACKGROUND OF THE INVENTION

1. Field of the Invention

The present invention relates to a brake control device for a wheeled walker and in particular, to a brake control device that has a controlling lever capable of shifting between a braked position, temporary braked position, and released position.

2. Description of the Related Art

Due to great strides in medicine within the past few decades, there has been a considerable increase in the average life expectancy. Concurrently, there has been a considerable change in the age profile of the general population in advanced countries which have felt the impact of improved drugs and medical procedures. Thus, the population of elderly people in advanced countries is now much higher than it was previously.

The increased number of elderly and disabled people in the population has created a need for walking aids or walkers of various types. Such walkers generally have a rigid frame construction with a plurality of legs which support the walker in an upright position. In usage, the walker is gripped for support and is lifted slightly or slid over a horizontal surface during the forward movement by the user.

Preferably, the walkers are quipped with wheels and brake. An example of such a wheeled walker also called walker auxiliary vehicle disclosed in Japanese Patent Publication H11-089889 has a pair of wheel brakes controllable by a brake lever operatively mounted on a handle section. For parking and long stay in a place, the brake lever is clamped by a brake lock. However, when a user needs to move the wheeled walker, the brake lever should be pulled toward the user for yielding some deformation that provides a gap allowing the brake lock to be rotated in an opposite direction to release the brake lever.

It is difficult for an elderly or disabled person lacking fine muscular coordination to release the brake lever with two hands simultaneously. This would contribute to a feeling of inconvenience in mind of the user and could, in an extreme case, cause the user to fall and injure himself or herself.

SUMMARY OF THE INVENTION

In order to improve the convenience for parking and decelerating the wheeled walker, the present invention provides an improved brake control device comprising a handle, a controlling lever, a driving member and a swing lever. The controlling lever is designed for manipulating by hand and fingers that can be shifted between a braked position, a temporary braked position, and a released position. The swing lever has one end pivotally connected to the handle, and another end pivotally connected with the controlling lever and the driving member.

The driving member has a portion slidably abutting an upper wall formed within the handle, and drives braking mechanism by pulling a connecting element via a rotation while the controlling lever moves the driving member either downwardly or upwardly. Preferably, the controlling lever is formed with a stop or protrusion at the lower edge thereof for self-keeping in the braked position for parking the wheeled walker.

It would be more safe and convenient for a user to brake and release such a brake control device simply by shifting the controlling lever which near the handle grip portion.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
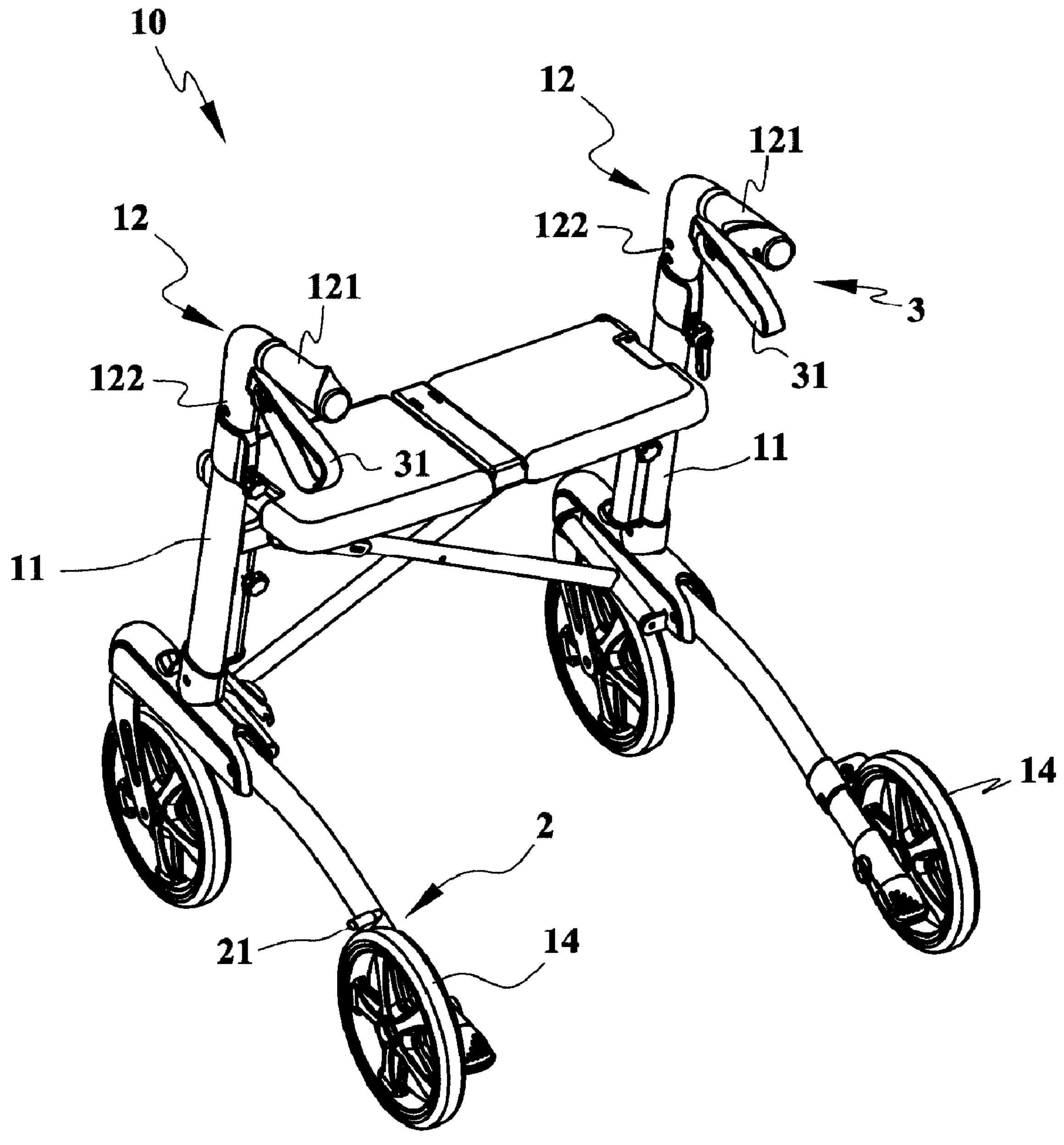
FIG. 1 is a perspective view of a brake control device according to present invention, which is connected with a push bar of a wheeled walker for driving a braking mechanism for either braking or parking purpose.
Figure 2:
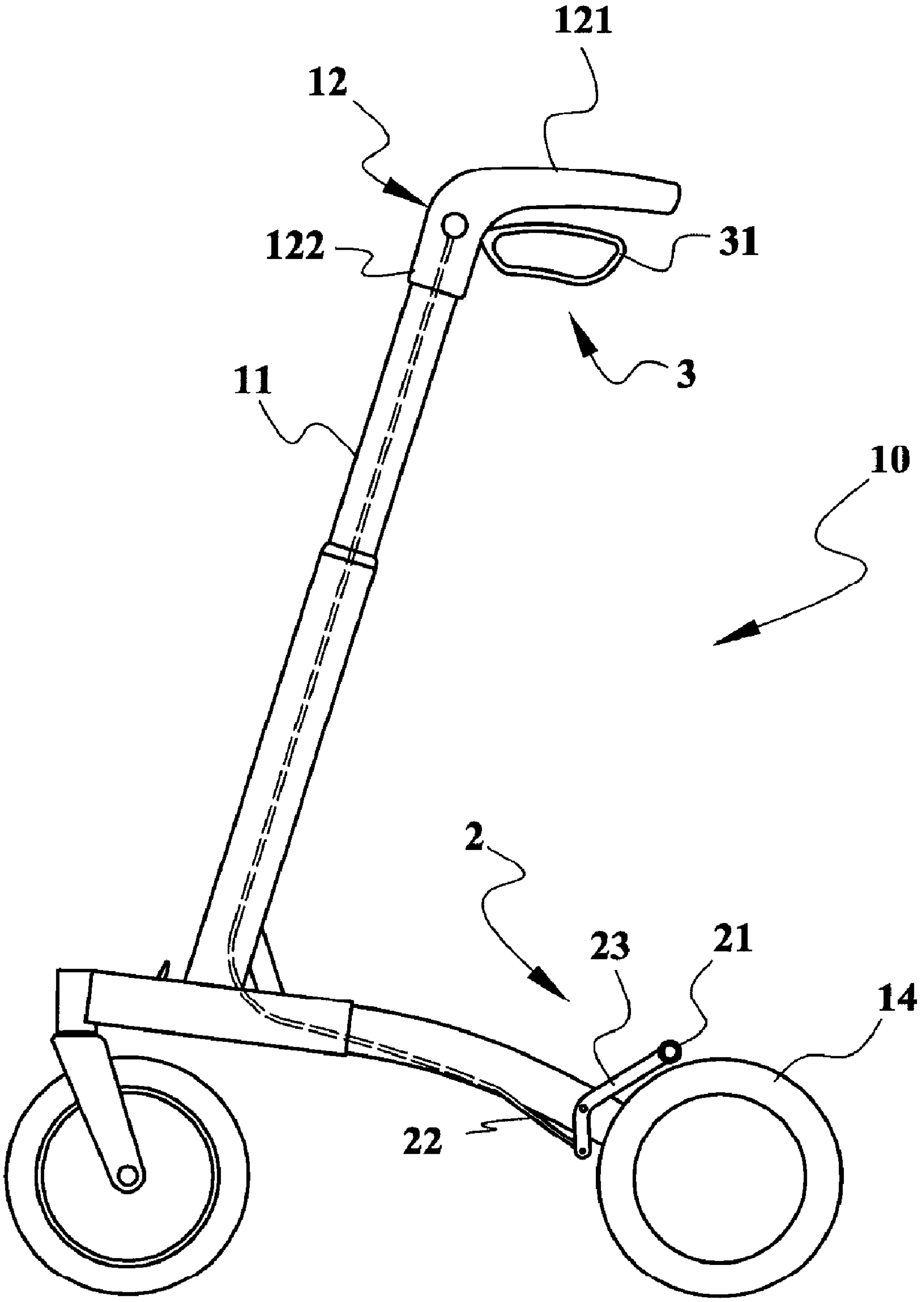
FIG. 2 is a schematic side view showing an embodiment of the brake mechanism according to the present invention, wherein the wheeled walker equipped with a braking mechanism operatively connect the brake control device according to present invention via a connecting element, such as a steel cable.
Figure 3:
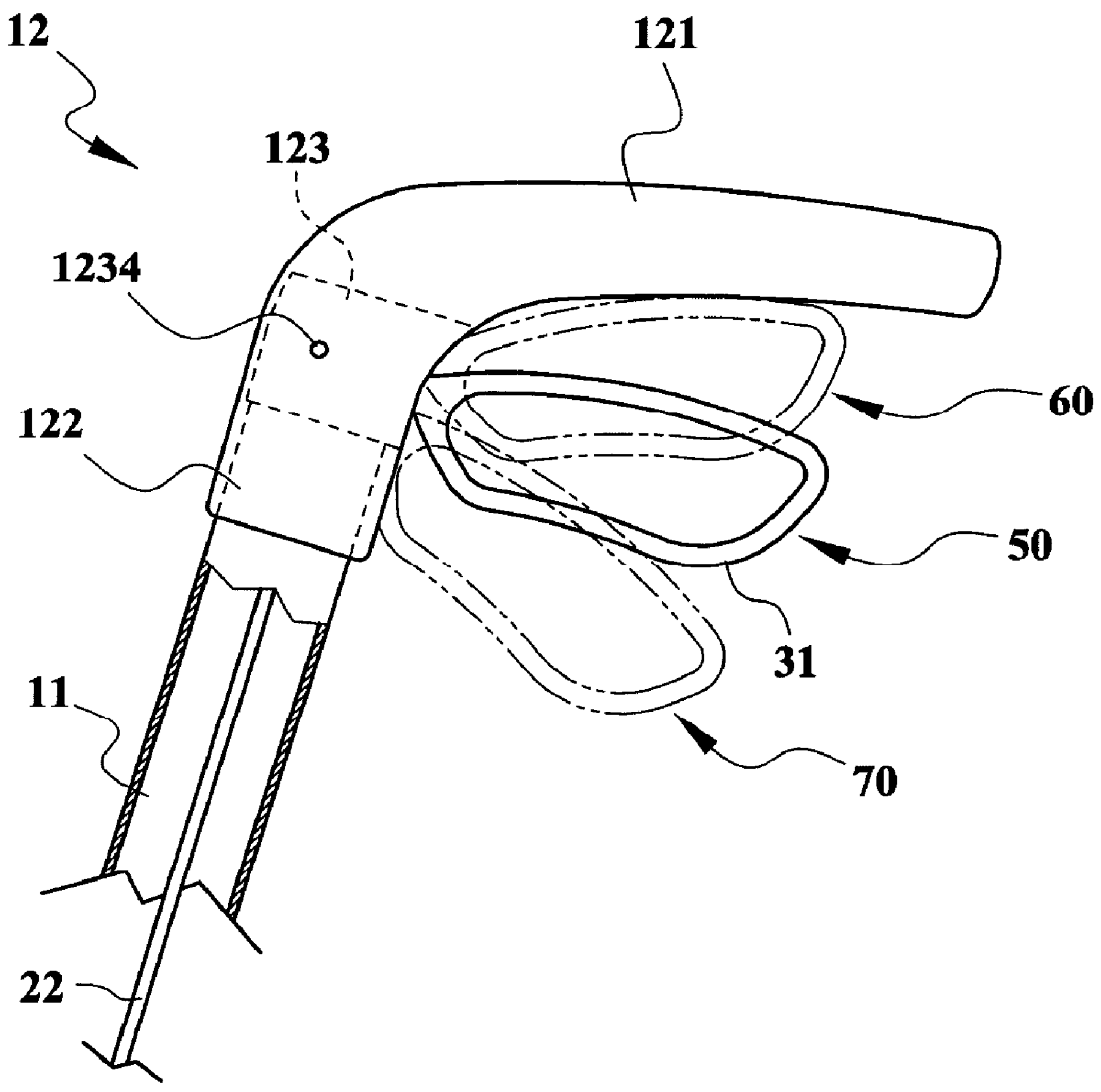
FIG. 3 is an enlarged schematic view showing the brake control device is operative between a released position, a temporary braked position, and a braked position.
Figure 4:
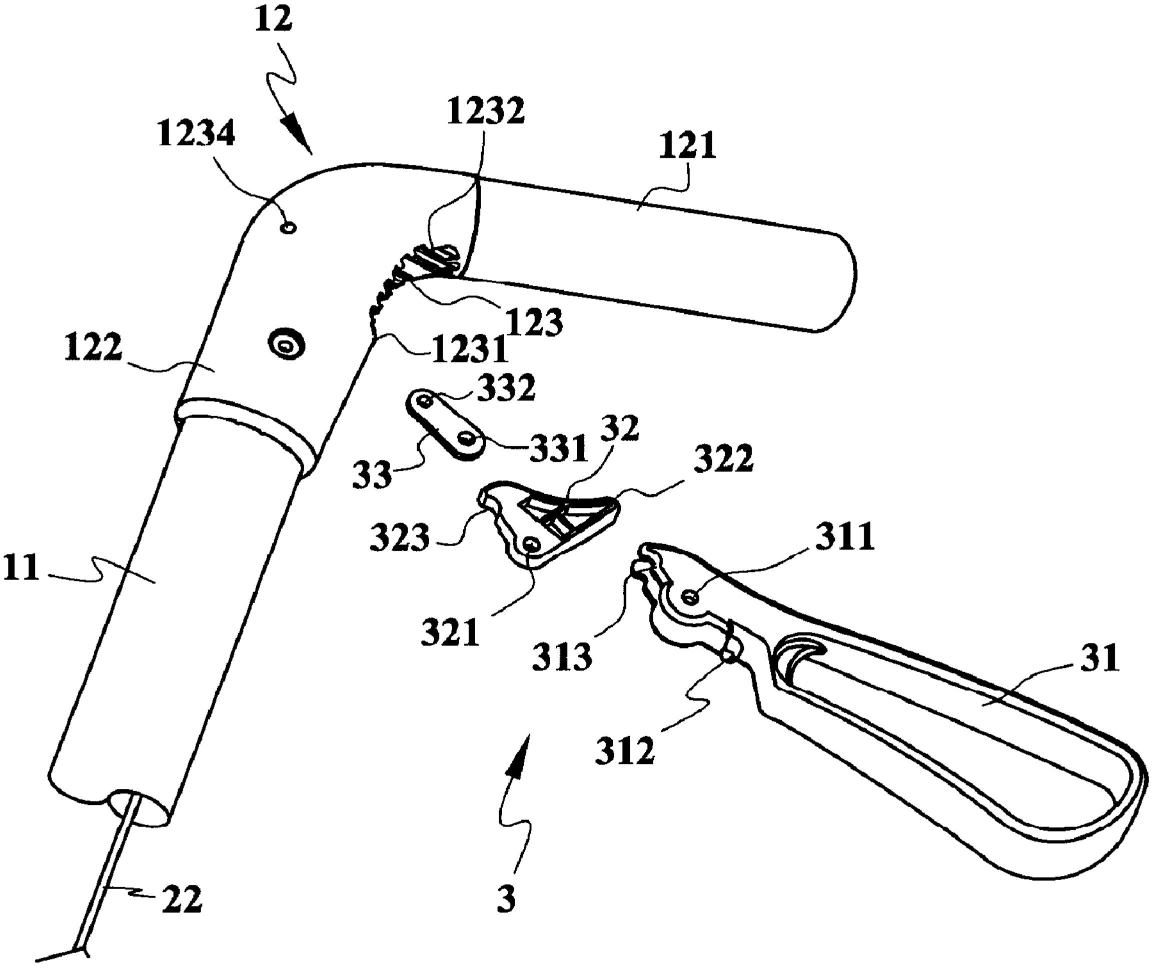
FIG. 4 is an exploded view showing the brake control device according to present invention.

Referring to FIGS. 1 and 2, an embodiment of a brake control device 3 of the present invention is operatively connected with a wheeled walker 10. The wheeled walker 10 has a pair of push bar 11 extended upwardly and may be slightly inclined toward the user, and a braking mechanism for braking the wheels 14 thereof.

The braking mechanism 2 is driven by the brake control device 3 through a connecting element 22, having a braking pad 31 and a driven lever 23. When the brake control device 3 is driven by the connecting element 22, the driven lever 23 is moving to forcing the braking pad 31 to contact the wheels 14 thereby to decelerate or stop the moving of the wheeled walker 10.

Referring to FIGS. 3 to 7, the brake control device 3 may comprise a handle 12, a controlling lever 31, a driving member 32 and a swing lever 33. The controlling lever 31 is designed for shifting between a released position 50 for keeping moving, a temporary braked position 60 for deceleration, and a braked position 70 for parking the wheeled walker 10.

The handle 12 has a handle grip portion 121 for gripping by palm of user, a connecting portion 122 connected with a push bar 11 of the wheeled walker 10, and a receiving space 123 defined by the wall thereof. The receiving space 123 has a lower edge 1231, an upper wall 1232, and an inner edge 1233.

The swing lever 33 has a first end 331 and a second end 332. A first pivot member 1234 is mounted on the wall of the handle 12 and pivotally connected with the swing lever 33 at the second end 332 within the receiving space 123, this allows the first end 331 of the swing lever 33 freely to rotate upwardly and downwardly. The first pivot member 1234 may be made of metal, such as a metal pin.

The driving member 32 is formed with a pivot hole 321, a sliding tip 322, and a second abutting portion 323. A second pivot member 1235 is penetrated through said pivot hole 321 thereby to pivotally connect the driving member 32 with the first end 331 of the swing lever 33 and the controlling lever 31.

The driving member 32 is connected with the braking mechanism 2 of the wheeled walker 10 via a connecting element 22 which may be pulled by a biasing member 34 in one direction that causes the sliding tip 322 slidably abutting against the upper wall 1232 of the receiving space 123.

The controlling lever 31 is formed with a first pivot hole 313 for pivotally connecting with the swing lever 33 and the driving member 32 by the second pivoting member 1235, and a first abutting portion 313 for detachably abutting on the first pivot member 1234 either in the released position 50 or the temporary braked position 60 thereof.

Figure 5:
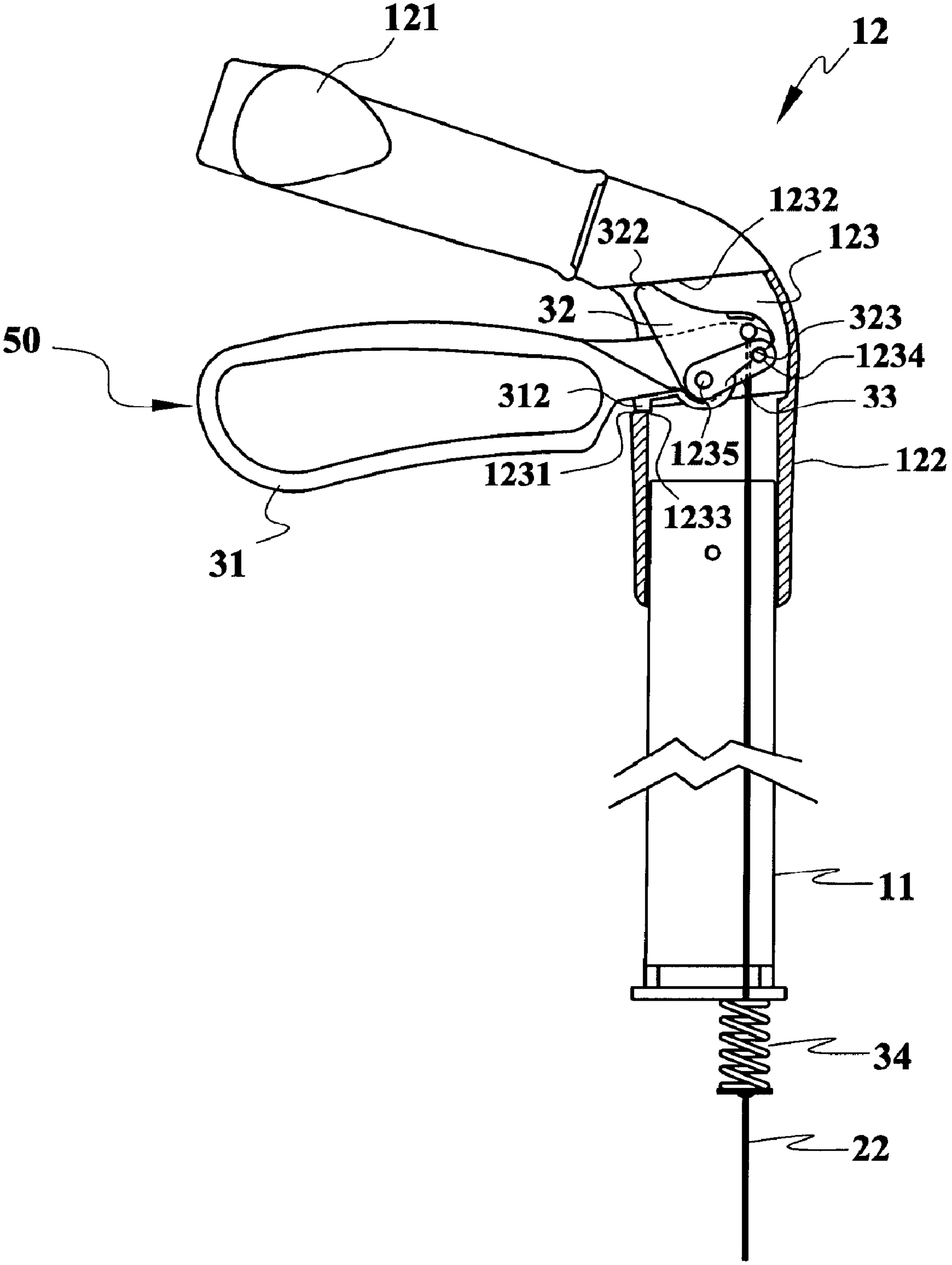
FIG. 5 is a cross-sectional view showing the brake control device according to present invention in a released position when the wheeled walker is moving with a user.

Referring to FIG. 5, when the controlling lever 31 is kept in the released position 50, the driving member 32 is pulled by the connecting element 22 downwardly, that would keep the lower side of the controlling lever 31 to rest on or abut against the lower edge 1231 of the receiving space 123. In the released position 50, the braking mechanism 2 is in an un-braking state, therefore to allow the user freely to move the wheeled walker back and forth.

Figure 6:
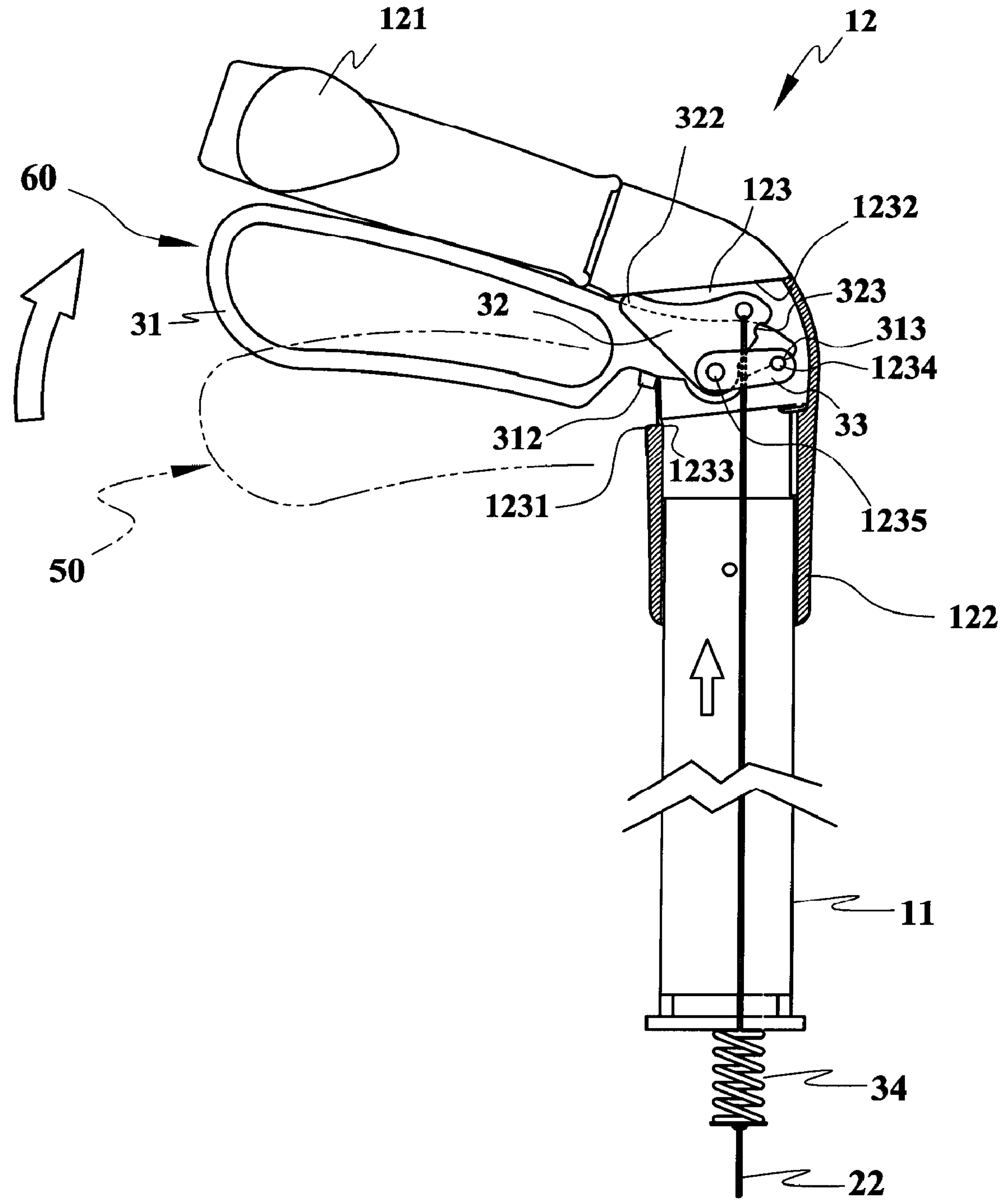
FIG. 6 is a cross-sectional view showing the brake control device according to present invention in a temporary braked position when a user is needed to decelerate the wheeled walker.

Referring to FIGS. 5 and 6, when the controlling lever 31 is shifted upwardly to the temporary braked position 60 for decelerating the wheeled walker 10, the second pivot member 1235 follows moving of the controlling lever 31 and then carries the driving member 32 to move upwardly, this makes the sliding tip 322 sliding along the upper wall 1232 in one direction and thereby pulls the connecting element 22 upwardly against the force of the biasing member 34, thereby to drive the braking mechanism 2 of the wheeled walker 10.

Figure 7:
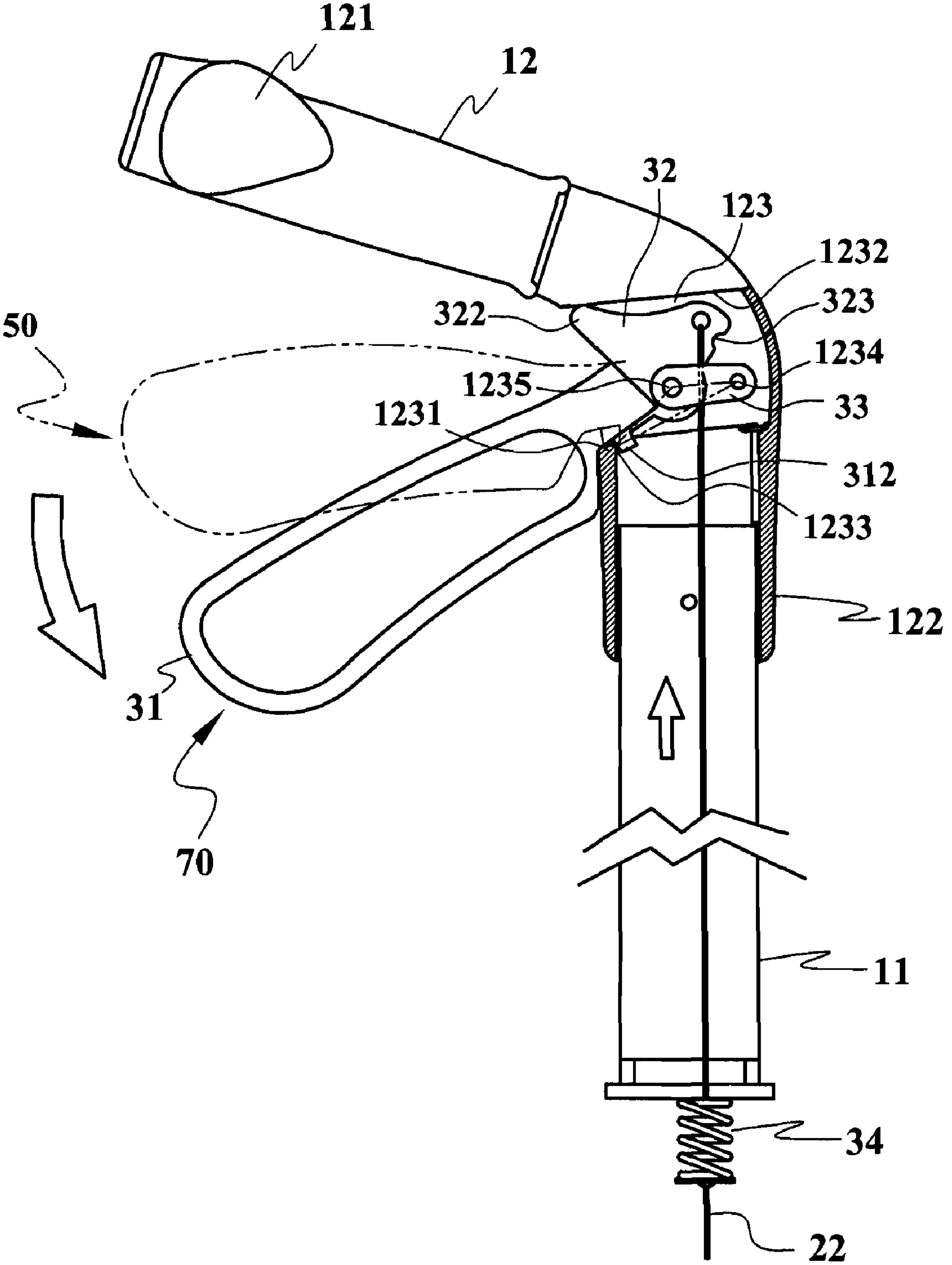
FIG. 7 is a cross-sectional view showing the brake control device according to present invention in a braked position when a user is needed to park the wheeled walker.

Referring to FIG. 7, the controlling lever 31 may be formed with a stop 312 or protrusions at the downside thereof for engaging with the inner edge 1233 of the receiving space 123 for self-keeping in the braked position 70 while being pushed downward. When the controlling lever 31 being kept in the braked position 70, the driving member 32 is driven by the second pivoting member 1235 and rotated in an angle that drives the braking mechanism 2 of the wheeled walker 10 into a braked position.

As will be appreciated, the first a butting portion 313 of the controlling lever 31 is formed with an indent for steadily abutting on the first pivot member 1234. With the same reason, the second abutting portion 323 may also be formed with an indent for steadily abutting on the first pivot member 1234.

Preferably, the connecting element 22 is a steel cable that threaded through the push bar 11. The biasing member 34 may be a compression spring, tension spring (not shown) connected with the connecting element 22 applying a tension force on the driving member 32, or a torsion spring (not shown) installed for biasing on the driven lever 23 for pulling the driving member 32 by rotation.

Figure 8:
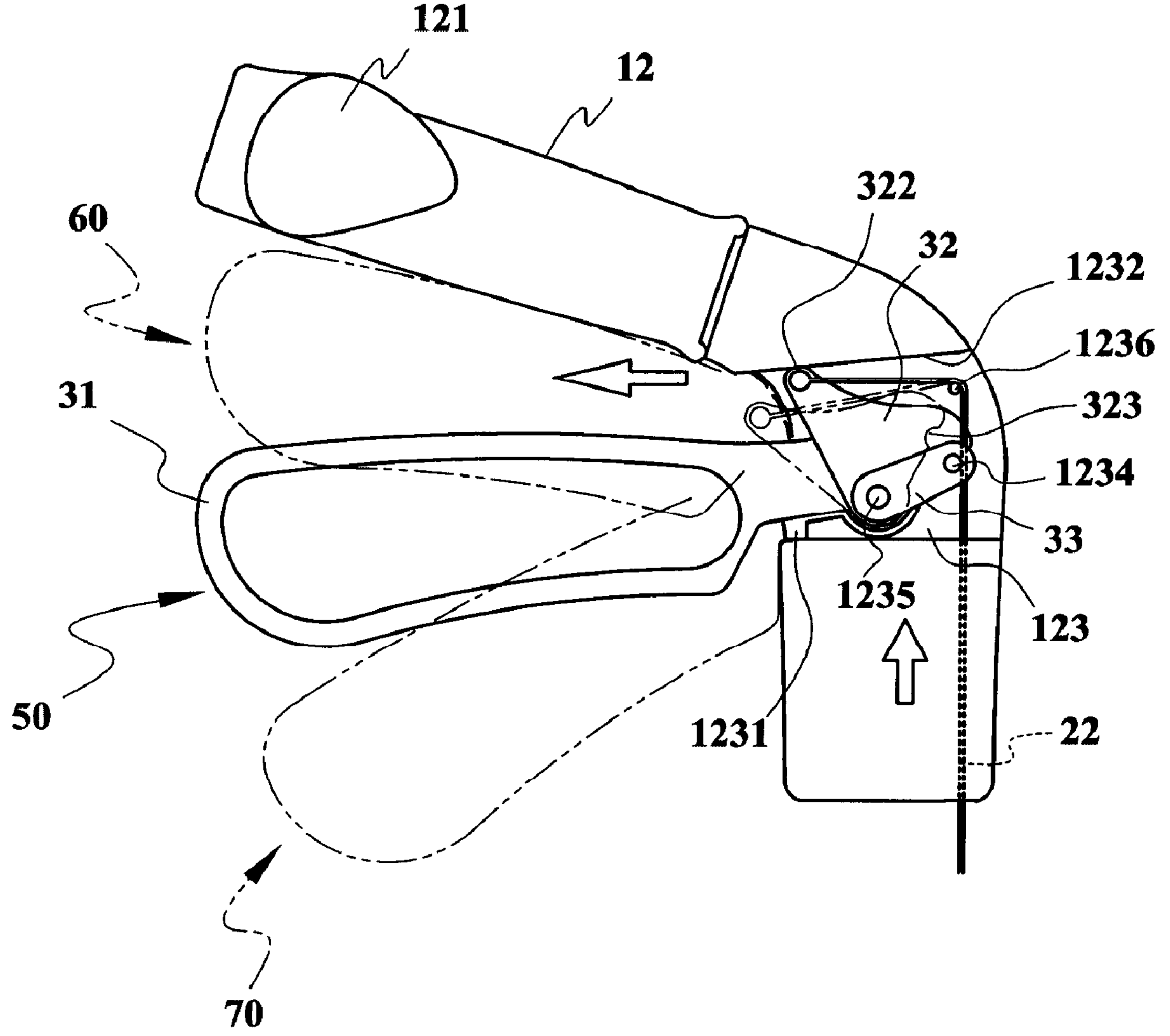
FIG. 8 is a cross-sectional view showing an alternative embodiment of the brake control device according to present invention, using a pin mounted within the receiving space of handle for guiding the moving of the connecting member.

For preventing the connecting element 22 from jammed in the receiving space 123, a pin 1236 can be mounted on the handle 12 for guiding the connecting element 22 in a predetermined path as shown in FIG. 8.

It would be more safe and convenient for a user to brake and release such a brake control device 3 either by rotating the controlling lever 31 upward and downward.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A brake control device for a wheeled walker, comprising:

- a handle connected with the wheeled walker, having a wall formed with a receiving space having a upper wall, a inner edge, and a lower edge;
- a swing lever having a second end pivoted within the receiving space by a first pivot member, and a first end which is rotatable about the second end;
- a driving member connected with a braking mechanism through a connecting element for braking the wheeled walker, formed with a sliding tip for slidably abutting against the upper wall, a second abutting portion for abutting on the first pivot member, and a pivot hole for pivot at the first end of the swing lever by a second pivoting member; and
- a controlling lever formed with a pivot hole for pivoting with the driving member and the swing lever by the second pivoting member, and a first abutting portion for abutting on the first pivot member.

2. The brake control device of claim 1, wherein the first pivot member is a metal pin mounted on the wall of the handle and pivotally connected the second end of the swing lever within the receiving space.

3. The brake control device of claim 1, wherein the handle further comprises a handle grip portion for grabbing by hand and a connecting portion for connecting with a push bar of the wheeled walker.

4. The brake control device of claim 1, wherein the controlling lever has a temporary braked position being rotated about the first pivoting member and moving the driving member by carrying the second pivoting member upwardly, so as to pull the connecting element for driving the braking mechanism to decelerate the wheeled walker.

5. The brake control device of claim 1, wherein the controlling lever has a released position that keeps a lower side of the controlling lever abutting against the lower edge of the receiving space, in said released position, the braking mechanism is in an un-braking state and allows the wheeled walker moving back and forth.

6. The brake control device of claim 1, wherein the controlling lever has a stop formed at lower edge thereof, said controlling lever has a braked position being kept by the stop abutting against the inner edge of the receiving space, that moving the driving member upwardly and rotating in a direction for pulling the connecting element upwardly, so as to driving the braking mechanism into a braked state.

7. The brake control device of claim 1, wherein the first abutting portion is an indent formed at a lower edge of the controlling lever.

8. The brake control device of claim 1, wherein the second abutting portion is an indent formed at an edge of the driving member.

9. The brake control device of claim 1, wherein the connecting element is guided by a pin mounted within the receiving space of the handle.

10. The brake control device of claim 1, wherein the connecting element is biased by a biasing member.

11. The brake control device of claim 10, wherein the biasing member is a compression spring connected with the connecting element and pulls the driving member moving downwardly.

12. The brake control device of claim 10, wherein the biasing member is a torsion spring mounted on the braking mechanism and pulls the driving member moving downwardly via the connecting element.

* * * * *